US011975436B2

(12) United States Patent
Abbott et al.

(10) Patent No.: US 11,975,436 B2
(45) Date of Patent: May 7, 2024

(54) SPINDLE LOCK FOR POWER TOOL

(71) Applicant: MILWAUKEE ELECTRIC TOOL CORPORATION, Brookfield, WI (US)

(72) Inventors: Jonathan E. Abbott, Milwaukee, WI (US); Ian A. Duncan, Colgate, WI (US); Brian J. Yue, Milwaukee, WI (US); Isabella A. Spek, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 45 days.

(21) Appl. No.: 17/689,293

(22) Filed: Mar. 8, 2022

(65) Prior Publication Data

US 2022/0281095 A1 Sep. 8, 2022

Related U.S. Application Data

(60) Provisional application No. 63/157,888, filed on Mar. 8, 2021.

(51) Int. Cl.
*B25F 5/00* (2006.01)
*B23B 31/36* (2006.01)
*B23Q 5/04* (2006.01)

(52) U.S. Cl.
CPC .............. *B25F 5/001* (2013.01); *B23B 31/36* (2013.01); *B23Q 5/043* (2013.01)

(58) Field of Classification Search
CPC .......... B23Q 5/043; B25F 5/001; B23B 31/36
See application file for complete search history.

(56) References Cited

U.S. PATENT DOCUMENTS

| 9,174,328 B2 | 11/2015 | Shi et al. |
| 2014/0262394 A1 | 9/2014 | Scott et al. |
| 2020/0217412 A1 | 7/2020 | Nakashima |
| 2020/0406444 A1* | 12/2020 | Kamiya ................ B25B 21/023 |

FOREIGN PATENT DOCUMENTS

| CN | 111085968 A | 5/2020 |
| EP | 2008773 A1 | 12/2008 |
| EP | 2554336 A2 | 2/2013 |

OTHER PUBLICATIONS

International Search Report and Written Opinion for Application No. PCT/US2022/019271 dated Jun. 22, 2022 (11 pages).

* cited by examiner

*Primary Examiner* — Daniel Jeremy Leeds
(74) *Attorney, Agent, or Firm* — Michael Best & Friedrich LLP

(57) ABSTRACT

A power tool includes a housing, a motor supported by the housing, and an output spindle rotatably supported relative to the housing about an axis. The motor is operable to drive the output spindle about the axis. The power tool includes a spindle lock assembly between the motor and the output spindle. The spindle lock assembly is adjustable between an unlocked state in which the output spindle is rotatable relative to the housing about the axis and a locked state in which the output spindle is rotationally fixed relative to the housing. The spindle lock assembly includes a first resilient member, positioned between the housing and the output spindle. The first resilient member is configured to at least partially absorb a torque impulse from the output spindle when rotating in a first direction and when the spindle lock assembly transitions from the unlocked state to the locked state.

20 Claims, 9 Drawing Sheets

SPINDLE LOCK FOR POWER TOOL

CROSS-REFERENCE TO RELATED APPLICATIONS

This application claims priority to U.S. Provisional Patent Application No. 63/157,888 filed on Mar. 8, 2021, the entire content of which is incorporated herein by reference.

FIELD OF THE DISCLOSURE

The present disclosure relates to power tools, and more particularly to a spindle lock for power tools.

BACKGROUND

In conventional power tool spindle lock designs, the abrupt seizing of a chuck assembly when transitioning into a locked state may create an undesirable jerking force of the power tool that is transmitted to the operator holding the power tool. In addition, the abrupt seizing of the chuck assembly can reduce an operating-life cycle of the chuck assembly and an operating-life cycle of a tool bit secured within the chuck assembly.

SUMMARY OF THE DISCLOSURE

The disclosure provides, in one aspect, a power tool including a housing, a motor supported by the housing, and an output spindle rotatably supported relative to the housing about an axis. The motor is operable to drive the output spindle about the axis. The power tool includes a spindle lock assembly between the motor and the output spindle. The spindle lock assembly is adjustable between an unlocked state in which the output spindle is rotatable relative to the housing about the axis and a locked state in which the output spindle is rotationally fixed relative to the housing. The spindle lock assembly includes a first resilient member, positioned between the housing and the output spindle. The first resilient member is configured to at least partially absorb a torque impulse from the output spindle when rotating in a first direction and when the spindle lock assembly transitions from the unlocked state to the locked state.

The disclosure provides, in another aspect, a power tool including a housing, a motor supported within the housing, an output spindle rotatably supported relative to the housing about an axis, a gear case coupled to the housing, a gearcase ring positioned within the gearcase, and a spindle lock assembly. The motor is operable to drive the output spindle about the axis. The spindle lock assembly is positioned between the motor and the output spindle. The spindle lock assembly is adjustable between an unlocked state in which the output spindle is rotatable relative to the gearcase and the housing about the axis and a locked state in which the output spindle is rotationally fixed relative to the gearcase and the housing. The spindle lock assembly includes a first resilient member, positioned between the gearcase and the gearcase ring. The first resilient member is configured to at least partially absorb a torque impulse from the output spindle when rotating in a first direction and when the spindle lock assembly transitions from the unlocked state to the locked state.

The disclosure provides, in yet another aspect, a power tool including a housing, a motor supported within the housing, an output spindle rotatably supported relative to the housing about an axis, a gearcase coupled to the housing, a gearcase ring positioned within the gearcase, and a spindle lock assembly. The gearcase includes a first and second radially inward-extending protrusions. The gearcase ring includes a radially outward-extending projection positioned between the first and second radially inward-extending protrusions. The motor is operable to drive the output spindle about the axis. The spindle lock assembly is positioned between the motor and the output spindle. The spindle lock assembly is adjustable between an unlocked state in which the output spindle is rotatable relative to the gearcase and the housing about the axis and a locked state in which the output spindle is rotationally fixed relative to the gearcase and the housing. The spindle lock assembly includes a first resilient member and a second resilient member. The first resilient member is positioned between the radially outward-extending projection of the gearcase ring and the first radially inward-extending protrusion of the gearcase. The second resilient member is positioned between the radially outward-extending projection of the gearcase ring and the second radially inward-extending protrusion of the gearcase. The first and second resilient members are configured to at least partially absorb a torque impulse from the output spindle when rotating, respectively, in a forward direction and a reverse direction, when the spindle lock assembly transitions from the unlocked state to the locked state.

Other features and aspects of the invention will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

DETAILED DESCRIPTION

Figure 1:
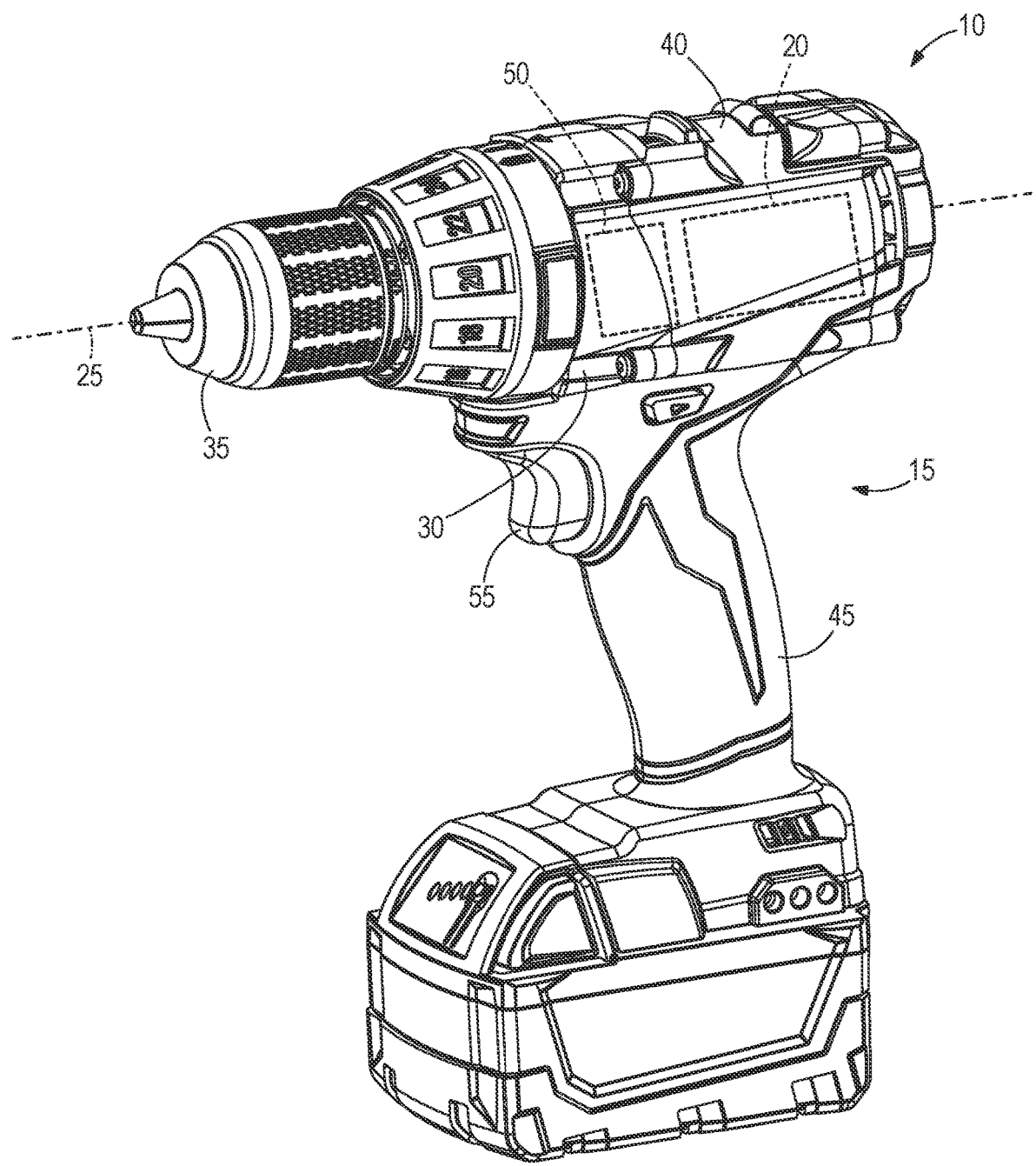
FIG. 1 is a perspective view of a power tool.

With reference to FIG. 1, a power tool 10 (e.g., a drill driver, right angle driver, hammer drill, etc.) includes a housing 15, a motor 20 defining a rotational axis 25, a gearcase 30 (e.g., a gearcase housing) coupled to the housing 15, and a chuck assembly 35 extending from the gearcase 30. In particular, the housing 15 includes a motor support portion 40 that supports the motor 20 and a gripping portion 45 operable to be gripped by an operator during operation of the power tool 10. In some embodiments, the gearcase 30 is unitized with and is an extension of the housing 15. The power tool 10 also includes a transmission 50 positioned between the motor 20 and the chuck assembly 35 (e.g., at least partially supported within the gearcase 30) for transferring torque from the motor 20 to the chuck assembly 35. In some embodiments, the transmission 50 can include a single stage planetary transmission, dual stage planetary transmission, etc.

Although not shown in FIG. 1, the power tool 10 may include a battery pack electrically connected to the motor 20 via a trigger 55 to provide power to the motor 20. Such a battery pack may be an 18-volt power tool battery pack that includes lithium-ion battery cells. Alternatively, the battery pack may include fewer or more battery cells to yield any of a number of different output voltages (e.g., 12 volts, 14.4 volts, etc.). Additionally, or alternatively, the battery cells may include chemistries other than lithium-ion such as, for example, nickel cadmium, nickel metal-hydride, or the like. Alternatively, the power tool 10 may include an electrical cord for connecting the motor 20 to a remote electrical source (e.g., a wall outlet).

Figure 2:
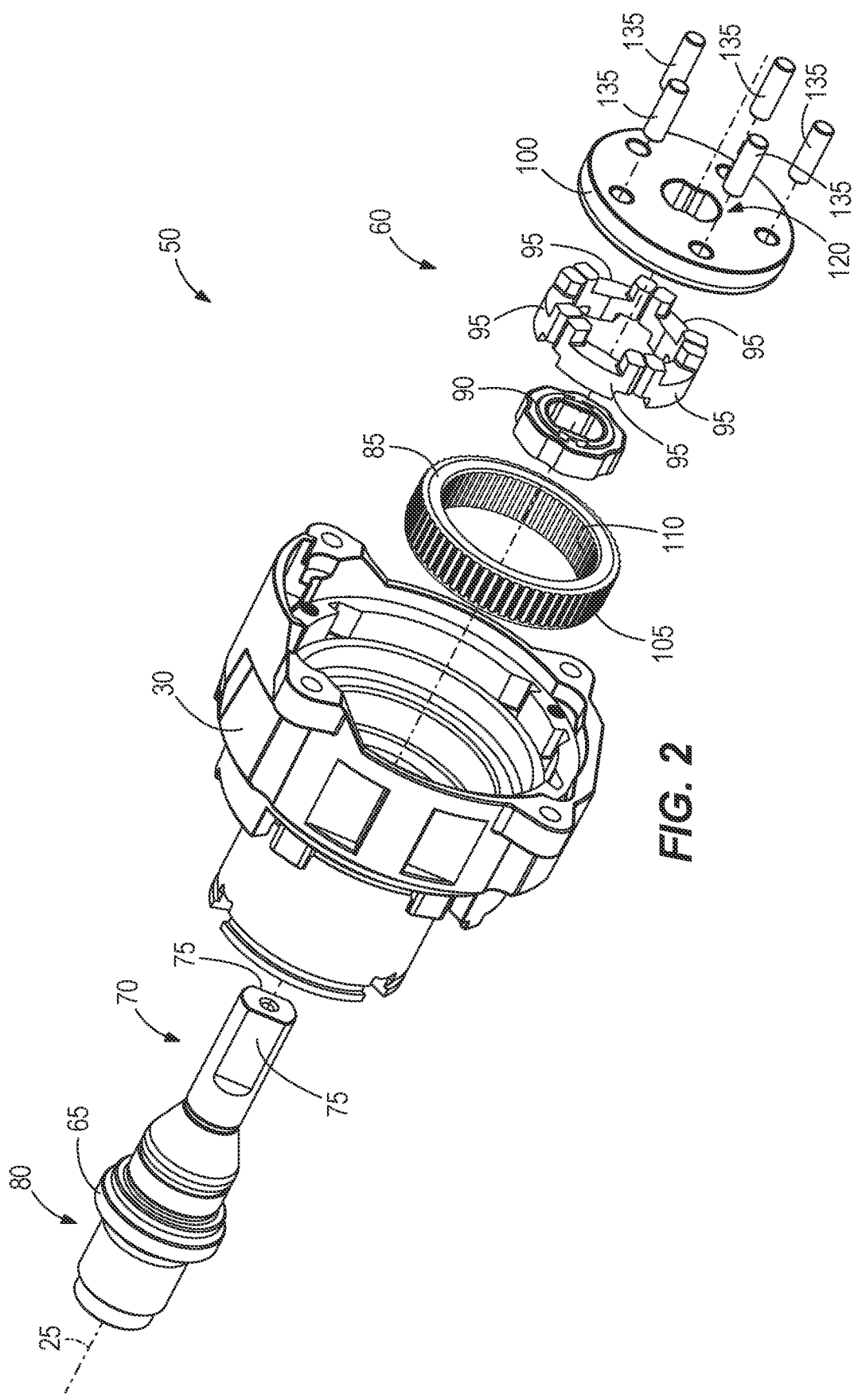
FIG. 2 is an exploded view of a portion of a transmission and spindle lock assembly for use in the power tool of FIG. 1.

As shown in FIG. 2, the illustrated transmission 50 includes a dampening spindle lock assembly 60 coupled to an output spindle 65 of the power tool 10. The spindle lock assembly 60 is operable to selectively lock the output spindle 65 relative to the housing 15/gearcase 30 in either rotational direction about the axis 25 as discussed in more detail below. The output spindle 65 includes a driven end portion 70 having opposing flats 75 and a drive end portion 80 that is coupled to the chuck assembly 35 to drive the chuck assembly 35. The illustrated spindle lock assembly 60 includes a housing or gearcase ring 85, a cam member 90, followers 95, and a drive gear 100 positioned within the gearcase 30.

In the illustrated embodiment, the gearcase ring 85 is fixed within the gearcase 30. The gearcase ring 85 includes outer teeth 105 that engage the gearcase 30 to inhibit relative rotation therebetween. In some embodiments, the gearcase ring 85 can be press-fit into the gearcase 30, or the gearcase ring 85 can be formed integral as one-piece with the gearcase 30. However, in the embodiment where the gearcase ring 85 and the gearcase 30 are separate components, the gearcase ring 85 can be manufactured from a more durable material (e.g., ferrous material such as steel), whereas the gearcase 30 can be manufactured from a cheaper and/or lighter material (e.g., nonferrous material such as aluminum). The gearcase ring 85 also includes inner teeth 110.

Figure 3:
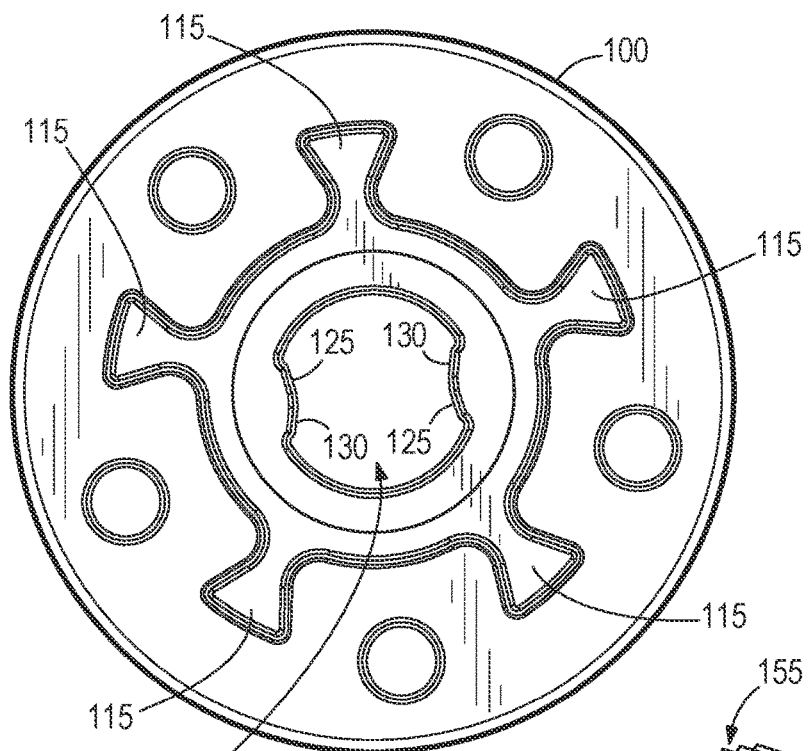
FIG. 3 is a front view of a drive gear of the spindle lock assembly of FIG. 2.

With reference to FIGS. 2 and 3, the drive gear 100 includes radially extending lugs 115 positioned around a non-circular bore 120 that receives the driven end portion 70 of the output spindle 65. The illustrated non-circular bore 120 is partially defined by pairs of parallel flats 125, 130 that interface with the flats 75 of the output spindle 65. The drive gear 100 is a carrier coupled to planetary gears of the transmission 50 by pins 135. In the illustrated embodiment, the drive gear 100 includes five lugs 115, however, in other embodiments, the drive gear 100 can include fewer or more than five lugs 115.

Figure 4:
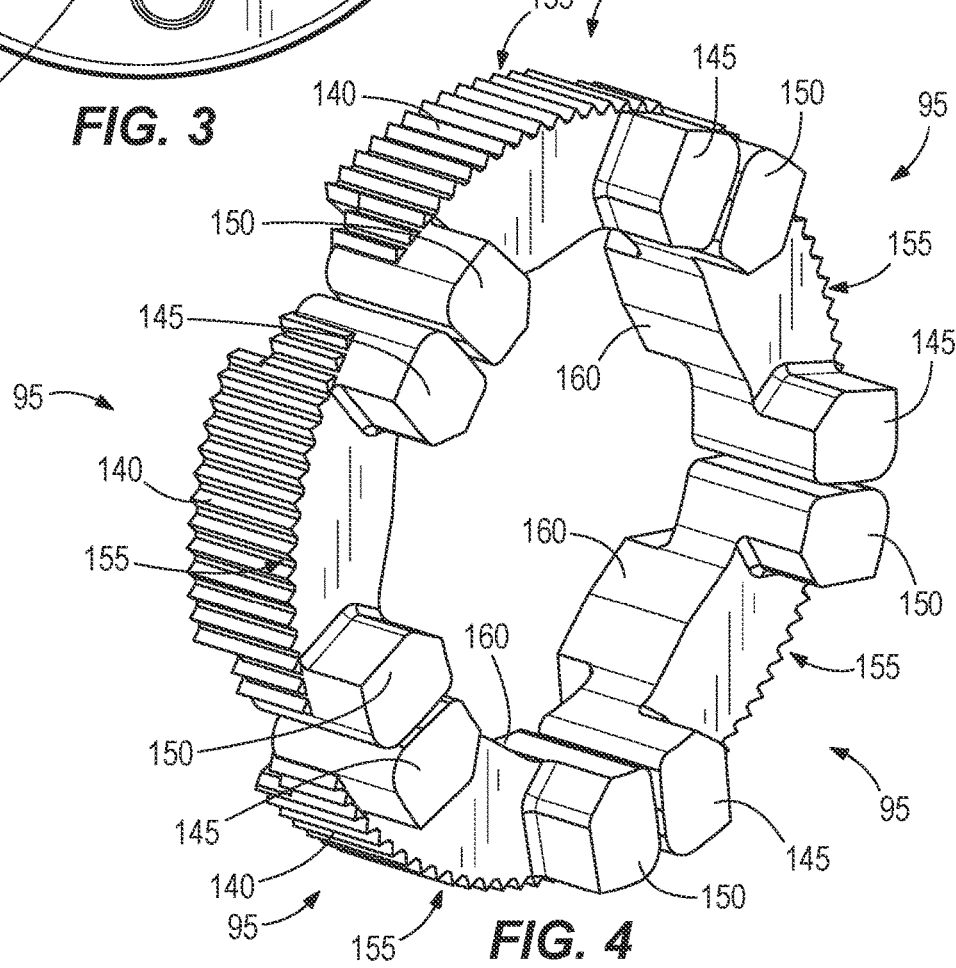
FIG. 4 is a perspective view of a plurality of followers of the spindle lock assembly of FIG. 2.

With reference to FIGS. 2 and 4, each follower 95 includes a radially outward-facing surface having teeth 140, posts 145, 150 separated by a gap 155, and an inward-facing surface 160. The followers 95 are coupled between the drive gear 100, the cam member 90, and the gearcase ring 85. In particular, each lug 115 of the drive gear 100 is positioned within a gap 155 of a follower 95, the teeth 140 of the outward-facing surfaces selectively interface with the inner teeth 110 of the gearcase ring 85, and the inward-facing surfaces 160 selectively interface with the cam member 90. In the illustrated embodiment, the spindle lock assembly 60 includes five followers 95, however, in other embodiments, the spindle lock assembly 60 can include fewer or more than five followers 95.

Figure 5:
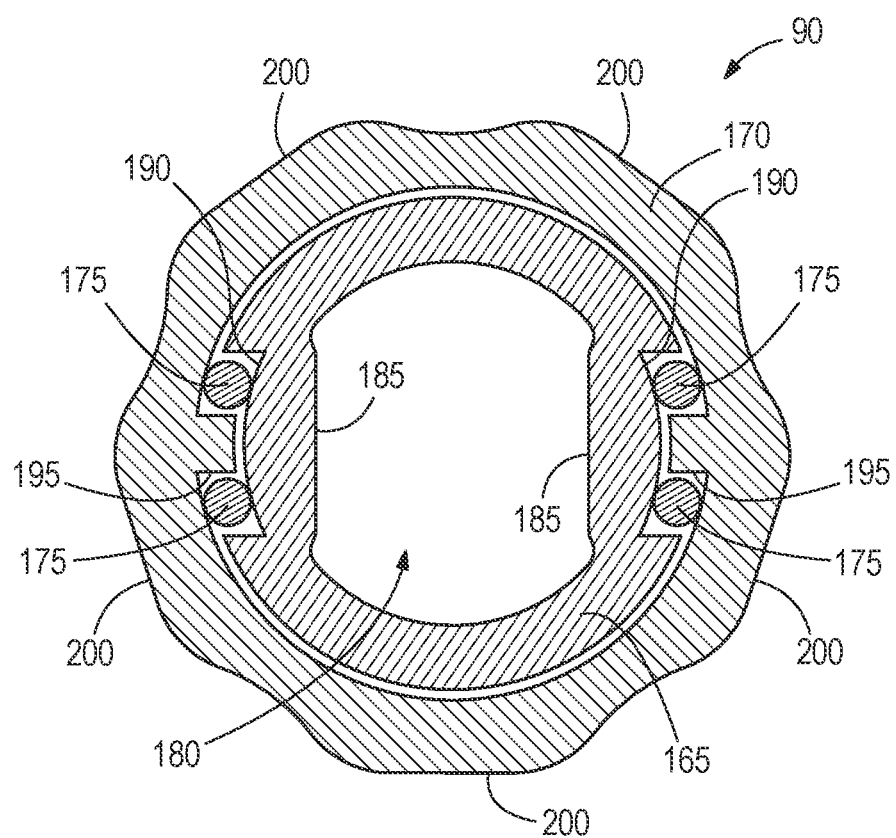
FIG. 5 is a cross sectional view of a cam member of the spindle lock assembly of FIG. 2 including resilient members positioned between inner and outer rings of the cam member.

As best shown in FIG. 5, the cam member 90 includes an inner member 165 (e.g., an inner ring), an outer member 170 (e.g., an outer ring), and at least one resilient member 175 positioned between the inner and outer members 165, 170. The inner member 165 includes a non-circular bore 180 partially defined by pairs of parallel flats 185 that engage with the flats 75 of the output spindle 65. The inner member 165 also includes slots 190 formed in an outer periphery of the inner member 165. In the illustrated embodiment, the inner member 165 includes two opposing slots 190, however, in other embodiments, the inner member 165 can include fewer or more than two slots 190. The illustrated outer member 170 includes projections 195 received within the slots 190 of the inner member 165. Accordingly, the outer member 170 can include as many projections 195 as slots 190 of the inner member 165. Two resilient members 175 are positioned within each slot 190 such that a projection 195 is positioned between the two resilient members 175. In sum, four resilient members 175 are positioned between the inner and outer members 165, 170. In the illustrated embodiment, the resilient members 175 are elastomeric slugs. In other embodiments, the cam member 90 can include fewer or more than four resilient members 175 positioned between the inner and outer members 165, 170, and/or the resilient members 175 can be configured differently (e.g., elastomeric strip(s), spring(s), polymer overmold on at least a portion of the outer periphery of the inner member 165 and/or polymer overmold on at least a portion of an inner periphery of the outer member 170, etc.). In further embodiments, the inner and outer members 165, 170 can be formed as a single integral component with the resilient member(s) 175 positioned between the single piece cam member and the output spindle 65. In yet further embodiments, the resilient member(s) 175 can also or alternatively be positioned between different components of the spindle lock assembly 60 (e.g., between the gearcase ring 85 and the gearcase 30). In addition, the outer member 170 includes cam lobes 200 on a periphery of the outer member 170 that selectively interface with the inward-facing surface 160 of the followers 95. In the illustrated embodiment, the outer member 170 includes five cam lobes 200. Alternatively, the cam member 90 can include fewer or more than five cam lobes 200.

In operation of the power tool 10, the gripping portion 45 of the housing 15 is grasped by the operator of the power tool 10 and the trigger 55 is actuated. In turn, the motor 20 drives the drive gear 100 through the planetary transmission. When it is desired to rotate the output spindle 65 in a first direction, the pair of flats 125 on the drive gear 100 are engaged with the flats 75 on the output spindle 65. Likewise, when it is desired to rotate the output spindle 65 in an opposite, second direction, the pair of flats 130 on the drive gear 100 are engaged with the flats 75 on the output spindle 65. In this manner, the output spindle 65 may be rotated relative to the drive gear 100 (in response to a torque input to the output spindle 65) because of the clearance between the flats 75 and the individual flats 125, 130. In addition, the posts 145 are engaged with the lugs 115 when the drive gear 100 is rotated in the first direction, whereas the posts 150 are engaged with the lugs 115 when the drive gear 100 is rotated in the second direction. Accordingly, the followers 95 co-rotate with the drive gear 100 when the drive gear 100 drives the followers 95 in either the first direction or the second direction. Due to the shape of the lugs 115, the lugs 115 are operable to maintain the followers 95 in a radially inward position in which a nominal clearance exists between the teeth 140 of the followers 95 and the inner teeth 110 of the gearcase ring 85. In other words, the spindle lock assembly 60 is in an unlocked state when the followers 95 are spaced from the gearcase ring 85. Also, the followers 95 remain generally aligned with the corresponding cam lobes 200 on the cam member 90 when the drive gear 100 drives the followers 95 in either the first direction or the second direction. Accordingly, with actuation of the trigger 55, torque is transferred from the drive gear 100 to the output spindle 65 to drive the chuck assembly 35 while maintaining the spindle lock assembly 60 in the unlocked state.

The spindle lock assembly 60 can transition into a locked state, for example, to change a tool bit secured to the chuck assembly 35. Specifically, torque is applied to the output spindle 65 by the chuck assembly 35 (e.g., by manually rotating the chuck assembly 35) rather than torque being applied to the output spindle 65 by the transmission 50 as described above. As a result, the output spindle 65 rotates the inner member 165 of the cam member 90 about the axis 25, and in turn, the inner member 165 then rotates the outer member 170 of the cam member 90 by the resilient members 175. In other words, the resilient members 175 are compressed between the inner and outer members 165, 170 when the inner member 165 rotates the outer member 170. As the outer member 170 rotates relative to the followers 95, the cam lobes 200 engage with the inward-facing surfaces 160 of the respective followers 95 for the cam lobes 200 to radially displace the followers 95 toward the fixed gearcase ring 85. As such, the teeth 140 of the followers 95 engage the inner teeth 110 of the gearcase ring 85. At this time, further rotation of the output spindle 65 and the cam member 90 relative to the followers 95 is halted/seized, and the cam lobes 200 wedge against the corresponding followers 95. Thereafter, the output spindle 65 remains seized or fixed relative to the gearcase 30 (i.e., the spindle lock assembly 60 is in the locked state), allowing the operator to rotate the chuck assembly 35 relative to the output spindle 65, for example, to change a tool bit on the chuck assembly 35.

In addition, the spindle lock assembly 60 can automatically transition into the locked state in a situation where the output spindle 65 rotates relative to or overruns the motor 20 (e.g., when the trigger 55 is released, the motor 20 will stop rotating, but the angular momentum of the output spindle 65/chuck assembly 35 will urge the output spindle 65 to continue rotating despite the motor 20 being deactivated). By automatically transitioning into the locked state, the spindle lock assembly 60 is operable to stop the chuck assembly 35 from rotating about the axis 25 when the trigger 55 is released. However, in conventional spindle lock designs, the abrupt seizing of the chuck assembly when transitioning into the locked state creates an undesirable jerking force of the power tool that is transmitted to the operator holding the power tool. In addition, the abrupt seizing of the chuck assembly can reduce an operating-life cycle of the chuck assembly and an operating-life cycle of a tool bit secured within the chuck assembly.

In the illustrated embodiment, the resilient members 175 introduce compliance within the spindle lock assembly 60 to absorb at least some of the torque impulses when the spindle lock assembly 60 transitions into the locked state. Specifically, once the followers 95 are wedged between the gearcase ring 85 and the outer member 170, the outer member 170 abruptly stops rotation about the axis 25. However, the angular momentum of at least the chuck assembly 35, the output spindle 65, and the inner member 165 act to compress the resilient members 175 between the inner and outer members 165, 170. As a result, the resilient members 175 absorb/dampen at least some of the abrupt torque impulses as the spindle lock assembly 60 transitions into the locked state. Accordingly, the resilient members 175 reduce wear on the chuck assembly 35 as the spindle lock assembly 60 transitions into the locked state, reduce undesirable noise made as the spindle lock assembly 60 transitions into the locked state, and reduce the jerking force of the power tool 10 that is transmitted to the operator holding the power tool 10 as the spindle lock assembly 60 transitions into the locked state. In other words, the illustrated spindle lock assembly 60 improves durability of the chuck assembly 35 and provides improved comfort for the operator using the power tool 10. The spindle lock assembly 60 also reduces wear on a tool bit secured to the chuck assembly 35 as less forces are transmitted to the chuck assembly 35 as the spindle lock assembly 60 transitions into the locked state.

In further embodiments, the spindle lock assembly 60 can include different degrees of compliance/resilience when rotating in the first and second directions. For example, the spindle lock assembly 60 can include a greater amount of compliance via the resilient members 175 when rotating in one direction than the other direction. In some embodiments, the shape of the slots 190, the shape of the resilient members 175, the hardness of the resilient members 175, etc., can change the amount of compliance within the spindle lock assembly 60.

In yet further embodiments, the spindle lock assembly 60 can be designed to provide compliance with the resilient members 175 when the spindle lock assembly 60 is rotating in one direction but omits any compliance when the spindle lock assembly 60 is rotating in the opposite direction. For example, one resilient member 175 can be positioned within each slot 190, and when in a neutral position, the resilient member 175 biases the projection 195 into a side surface of the slot 190. Accordingly, when the spindle lock assembly 60 rotates in one direction, the outer member 170 can rotate relative to the inner member 165 to compress the resilient member 175. However, relative rotation between the outer and inner members 165, 170 are inhibited when the spindle lock assembly 60 is rotated in the opposite direction as the projection 195 directly abuts the side surface of the slot 190.

Figure 6:
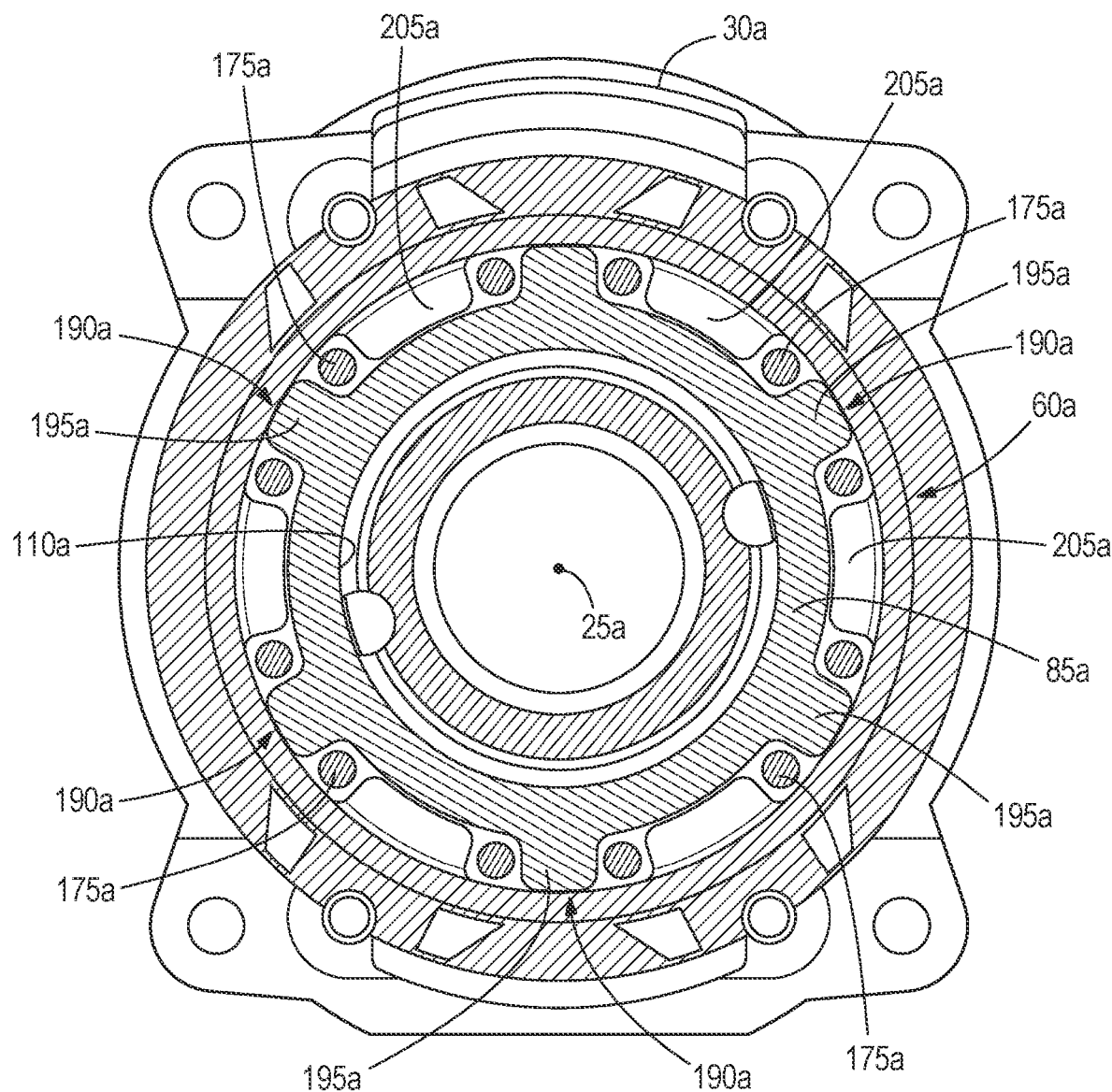
FIG. 6 is a rear view of a portion of a dampening spindle lock assembly according to another embodiment including resilient members positioned between a gearcase and a gearcase ring.
Figure 7:
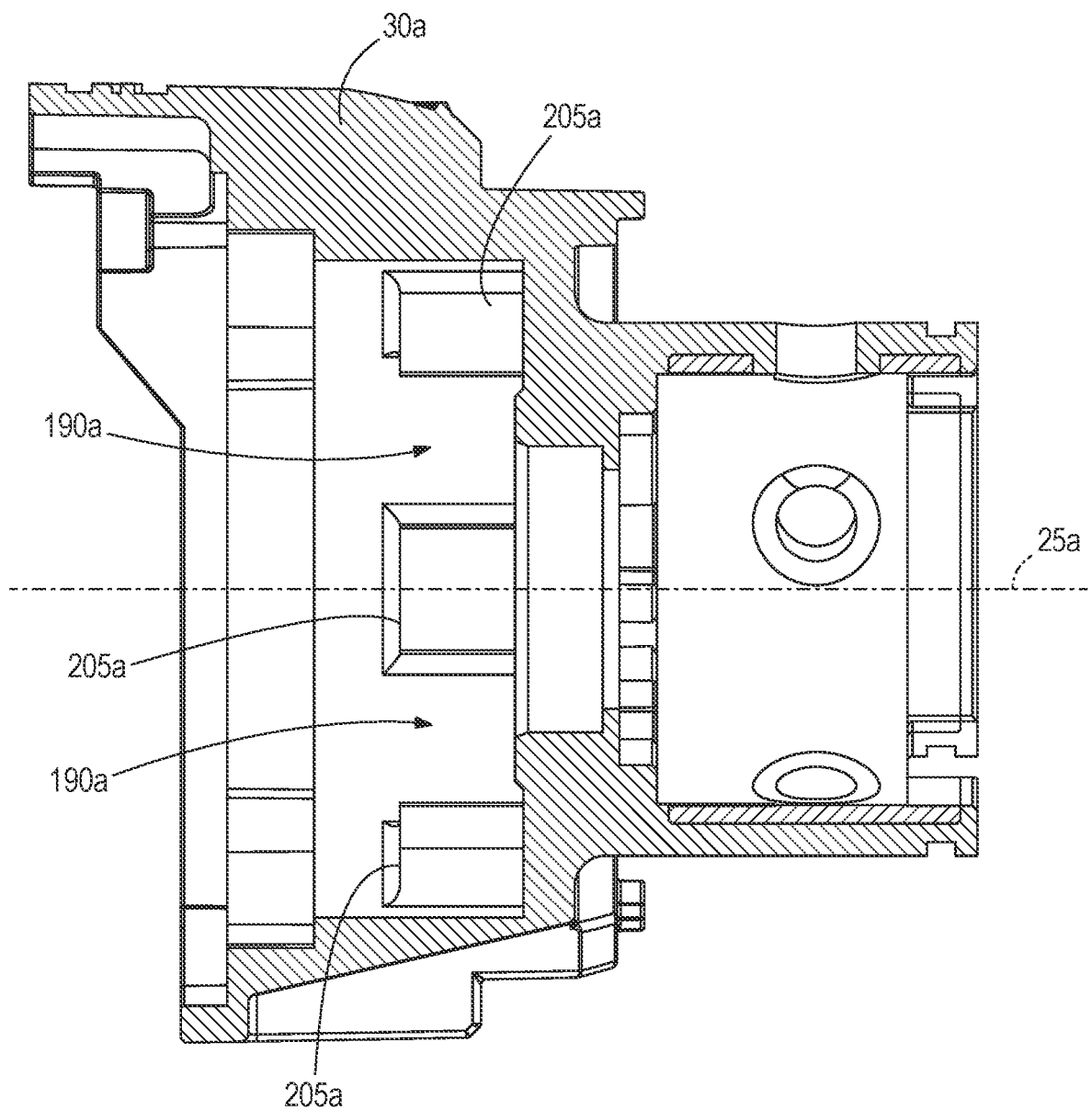
FIG. 7 is a cross sectional view of the gearcase of FIG. 6.
Figure 8:
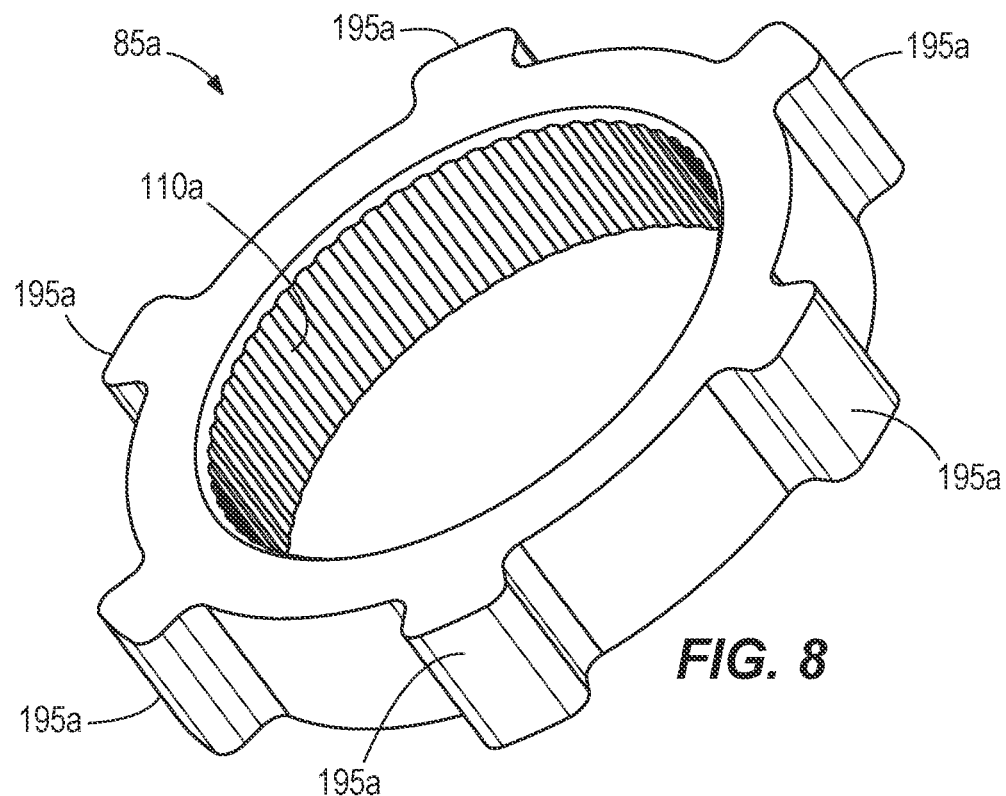
FIG. 8 is a perspective view of the gearcase ring of FIG. 6.

FIGS. 6-8 partially illustrate a damping spindle lock assembly 60a according to another embodiment. The spindle lock assembly 60a is similar to the spindle lock assembly 60; therefore, similar components are designated with similar references numbers including the letter "a." At least some differences and/or at least some similarities between the spindle lock assemblies 60, 60a will be discussed in detail below. In addition, components or features described with respect to only one or some of the embodiments described herein are equally applicable to any other embodiments described herein.

The illustrated spindle lock assembly 60a includes a gearcase ring 85a having outwardly extending projections 195a and inner teeth 110a. The gearcase ring 85a is received within a gearcase 30a such that each outwardly extending projection 195a is received within a slot 190a formed between adjacent inwardly extending protrusions 205a of the gearcase 30a. Two resilient members 175a (e.g., elastomeric slugs, springs, or the like) are positioned within each slot 190a such that a projection 195a is positioned between the two resilient members 175a. Accordingly, the gearcase ring 85a is allowed some rotational movement relative to the gearcase 30a about an axis 25a. In the illustrated embodiment, the gearcase ring 85a includes six projections 195a and the gearcase 30a includes six slots 190a, however, in other embodiments, the gearcase ring 85a and/or the gearcase 30a can include fewer or more than six projections 195a/slots 190a. In further embodiments, the resilient members 175a can be a polymer overmold around the periphery of the gearcase ring 85a. In yet further embodiments, the polymer overmold can be formed over the projections 195a. Also, in other embodiments, the polymer overmold can be formed over at least the protrusions 205a of the gearcase 30a.

In some embodiments, a support member (e.g., bearing, bushing, etc.) can be coupled to the gearcase ring 85a to support rotational movement of the gearcase ring 85a about the axis 25a relative to the gearcase 30a. In other embodiments, the gearcase ring 85a can include at least two concentric rings (e.g., an inner ring and an outer ring). The outer ring can be pressed into the gearcase 30a and can be manufactured from a material that more easily allows the inner ring to rotate within the outer ring (e.g., an oil-impregnated bushing). Also, the inner and outer rings can include interacting geometries and/or voids that allow for a compliant/resilient material to be positioned therebetween.

In further embodiments, a retainer can be coupled to the gearcase ring 85a to axially hold the gearcase ring 85a along the axis 25a. For example, the retainer can be a pressed back ring, a snap ring, etc., that allows rotational movement of the gearcase ring 85a about the axis 25a but inhibits axial movement and/or wobble of the gearcase ring 85a along the axis 25a. In other embodiments, the gearcase ring 85a can be axially slid into the gearcase 30 and then rotated (e.g., drop-in and twist engagement) to inhibit axial movement of the gearcase ring 85a (e.g., the protrusions 205a engage the projections 195a to inhibit axial movement of the gearcase ring 85a).

In addition, the spindle lock assembly 60a can include similar components to the spindle lock assembly 60 as described in the previous embodiment. For example, the spindle lock assembly 60a can include the drive gear 100, the followers 95, and the cam member 90 including the resilient members 175 between the inner and outer members 165, 170. In other embodiments, the spindle lock assembly 60a can include a single piece cam member such that the resilient members 175 between the inner and outer members 165, 170 are omitted.

In operation, the illustrated spindle lock assembly 60a adsorbs/dampens abrupt torque impulses created as the spindle lock assembly 60a transitions into a locked state. Specifically, as the spindle lock assembly 60a transitions into the locked state, a torque impulse is transferred from the gearcase ring 85a to the gearcase 30a such that the resilient members 175a are compressed therebetween. In other words, the gearcase ring 85a can rotate about the axis 25a to compress the resilient members 175a against the protrusions 205a of the gearcase 30a. The resilient members 175a allow the gearcase ring 85a, the followers, the cam member, the output spindle, and the chuck assembly to co-rotate relative to the gearcase 30a and reduce abrupt torque impulses created by the spindle lock assembly 60a from transferring to the chuck assembly.

Figure 9:
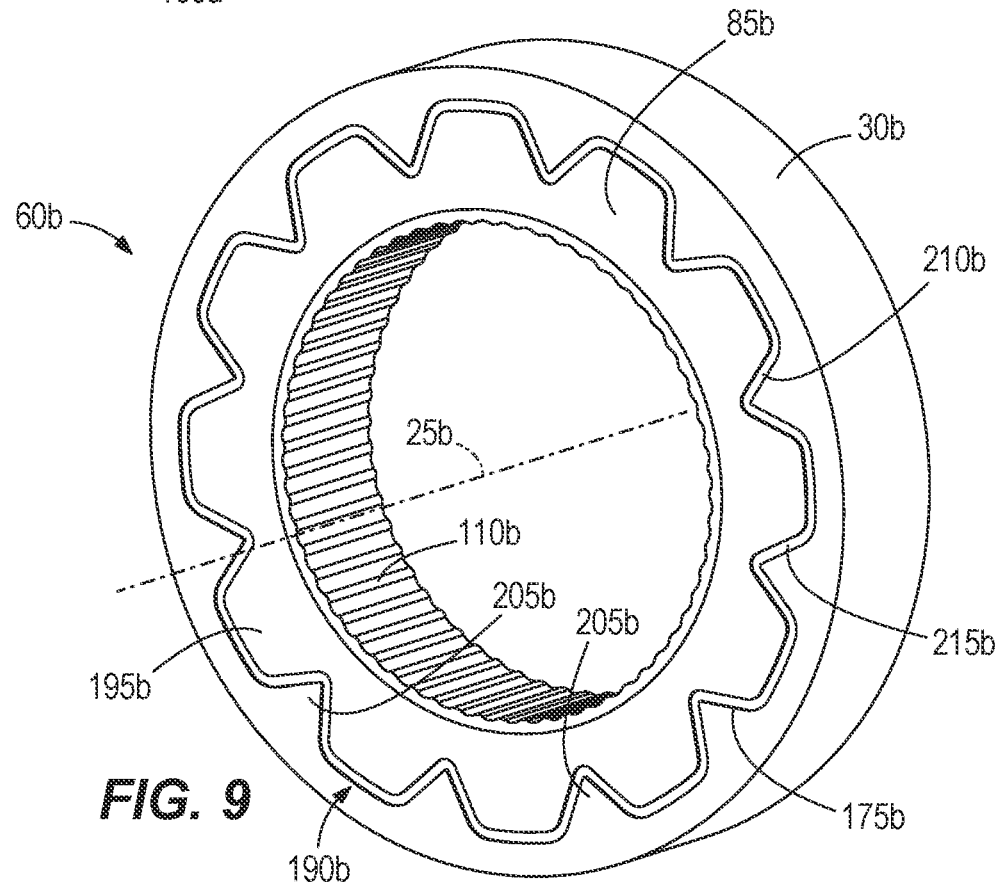
FIG. 9 is a perspective view of a portion of a dampening spindle lock assembly according to another embodiment including a resilient member positioned between a gearcase and a gearcase ring.

FIG. 9 partially illustrates a damping spindle lock assembly 60b according to another embodiment. The spindle lock assembly 60b is similar to the spindle lock assembly 60; therefore, similar components are designated with similar references numbers including the letter "b." At least some differences and/or at least some similarities between the spindle lock assemblies 60, 60b will be discussed in detail below. In addition, components or features described with respect to only one or some of the embodiments described herein are equally applicable to any other embodiments described herein.

The illustrated spindle lock assembly 60b includes a gearcase ring 85b having outwardly extending projections 195b and inner teeth 110b. The gearcase ring 85b is received within a gearcase 30b such that each outwardly extending projection 195b is received within a slot 190b between adjacent inwardly extending protrusions 205b of the gearcase 30b. A resilient member 175b (e.g., elastomeric strip, continuous member) is positioned between the gearcase ring 85b and the gearcase 30b in a serpentine-like path. Accordingly, the gearcase ring 85b is allowed some rotational movement relative to the gearcase 30b about an axis 25b. In the illustrated embodiment, the gearcase ring 85b includes twelve projections 195b and the gearcase 30b includes twelve slots 190b, however, in other embodiments, the gearcase ring 85b and/or the gearcase 30b can include fewer or more than twelve projections 195b/slots 190b.

In addition, the spindle lock assembly 60b can include similar components to the spindle lock assembly 60 as described in the previous embodiment. For example, the spindle lock assembly 60b can include the drive gear 100, the followers 95, and the cam member 90 including the resilient members 175 between the inner and outer members 165, 170. In other embodiments, the spindle lock assembly 60b can include a single piece cam member such that the resilient members 175 between the inner and outer members 165, 170 are omitted.

In operation, the illustrated spindle lock assembly 60b adsorbs/dampens the abrupt torque impulses created as the spindle lock assembly 60b transitions into a locked state. Specifically, as the spindle lock assembly 60b transitions into the locked state, a rotational force is transferred from the gearcase ring 85b to the gearcase 30b such that legs 210b, 215b of the resilient member 175b are compressed therebetween. In other words, the gearcase ring 85b can rotate about the axis 25*b* to compress the resilient member 175*b* against the protrusions 205*b* of the gearcase 30*b*. The resilient member 175*b* allows the gearcase ring 85*b*, the followers, the cam member, the output spindle, and the chuck assembly to co-rotate relative to the gearcase 30*b* and reduce abrupt torque impulses created by the spindle lock assembly 60*b* from transferring to the chuck assembly.

In some embodiments, the compliance between the gearcase 30*b* and the gearcase ring 85*b* can be changed by the resilient member 175*b*. For example, a thickness of the resilient member 175*b*, a hardness of the resilient member 175*b*, a path of the resilient member 175*b* between the gearcase 30*b* and the gearcase ring 85*b* (e.g., a degree of serpentine), etc., can be altered to attain a desired compliance. In addition, the desired resilience of the resilient member 175*b* can be different when the spindle lock assembly 60*b* rotates in one direction than the opposite direction. For example, the first legs 210*b* of the resilient member 175*b* positioned on one side of the projections 195*b* can be of different thickness than the second legs 215*b* of the resilient member 175*b* positioned on the opposite side of the projections 195*b*.

Figure 10:
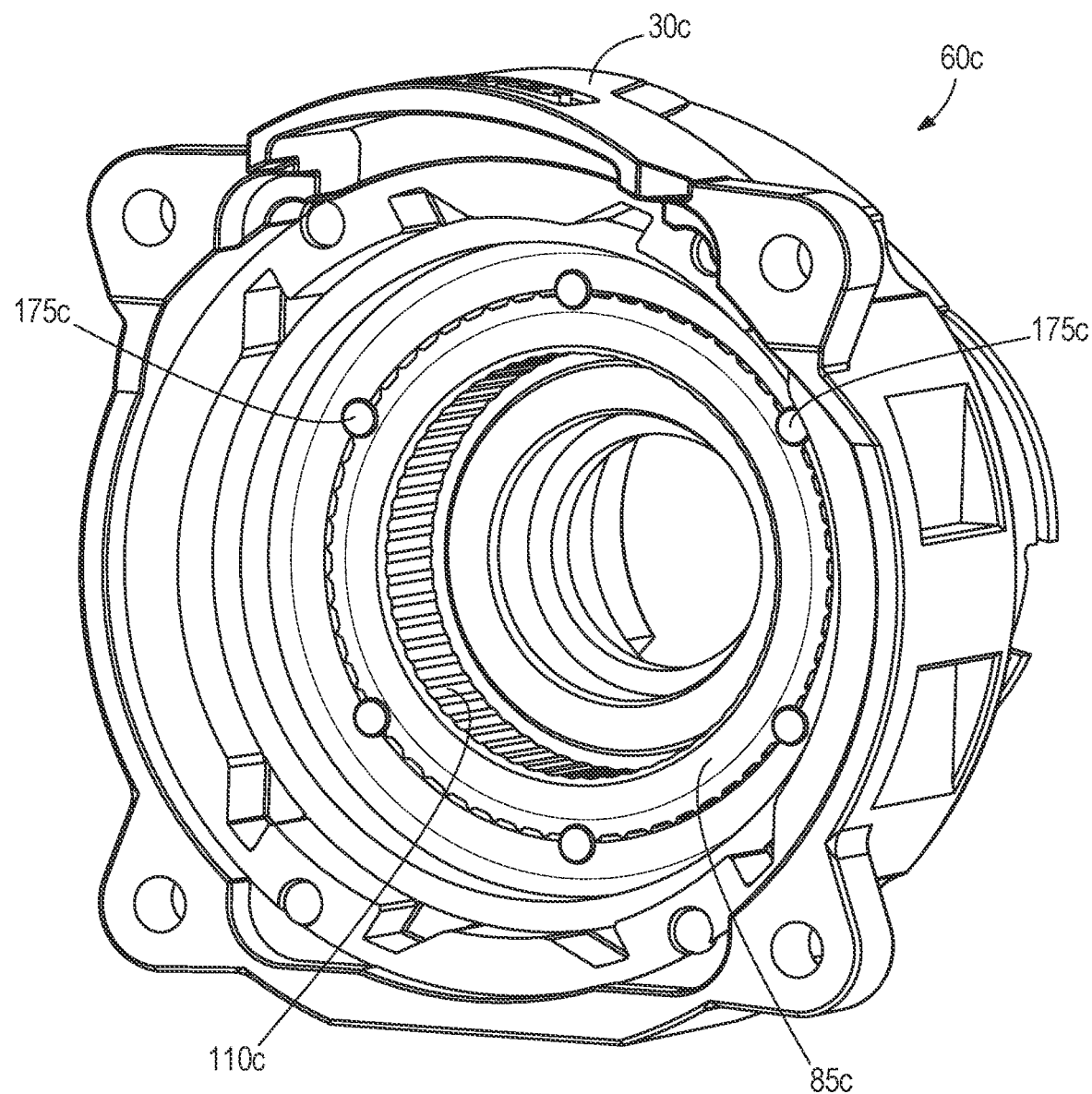
FIG. 10 is a perspective view of a portion of a dampening spindle lock assembly according to another embodiment including resilient members positioned between a gearcase and a gearcase ring.
Figure 11:
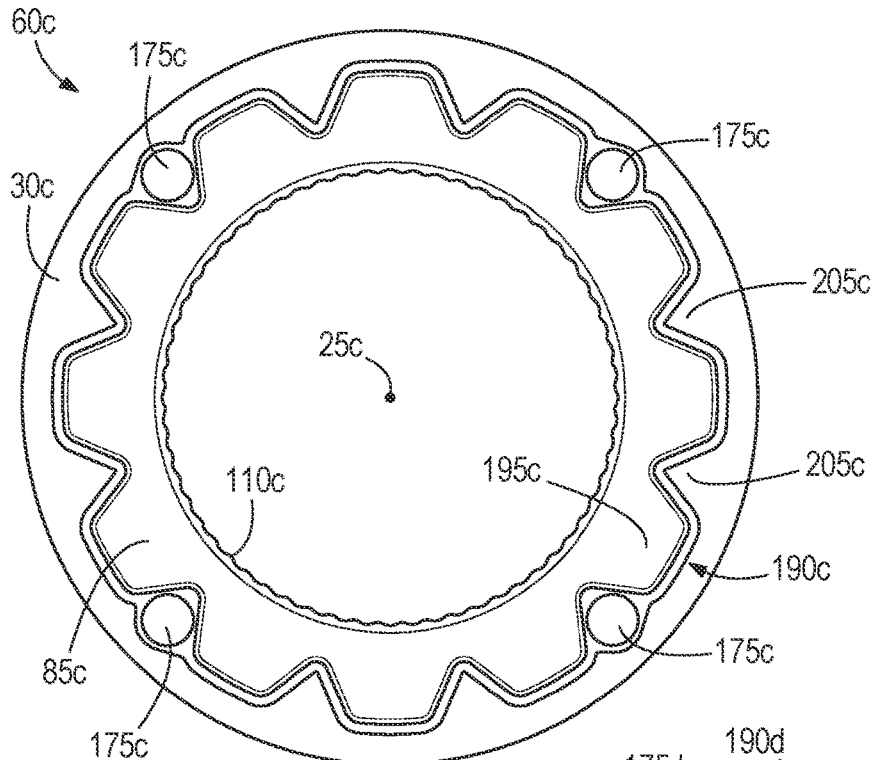
FIG. 11 is a front view of the spindle lock assembly of FIG. 10.

FIGS. 10 and 11 partially illustrate a damping spindle lock assembly 60*c* according to another embodiment. The spindle lock assembly 60*c* is similar to the spindle lock assembly 60; therefore, similar components are designated with similar references numbers including the letter "c." At least some differences and/or at least some similarities between the spindle lock assemblies 60, 60*c* will be discussed in detail below. In addition, components or features described with respect to only one or some of the embodiments described herein are equally applicable to any other embodiments described herein.

The illustrated spindle lock assembly 60*c* includes a gearcase ring 85*c* having outwardly extending projections 195*c* and inner teeth 110*c*. The gearcase ring 85*c* is received within a gearcase 30*c* such that each outwardly extending projection 195*c* is received within a slot 190*c* between adjacent inwardly extending protrusions 205*c* of the gearcase 30*c*. Resilient members 175*c* (e.g., elastomeric plugs/inserts) are positioned between the gearcase ring 85*c* and the gearcase 30*c* with a pocket (e.g., a circular pocket) at least partially surrounding each resilient member 175*c*. Accordingly, the gearcase ring 85*c* is allowed some rotational movement relative to the gearcase 30*c* about an axis 25*c*, and the resilient members 175*c* are provided extra space to deform/compress within the pockets.

Figure 12:
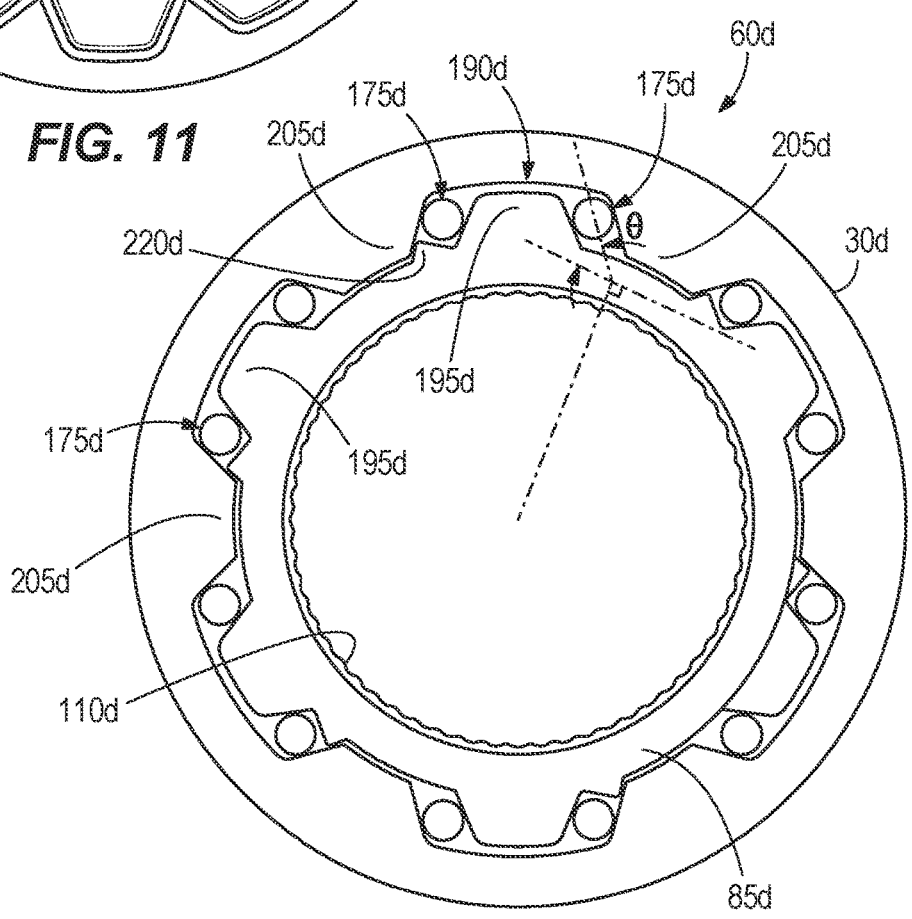
FIG. 12 is a rear view of a portion of a dampening spindle lock assembly according to another embodiment including resilient members positioned between a gearcase and a gearcase ring and a stop that limits rotational movement between the gearcase and the gearcase ring.

FIG. 12 partially illustrates a damping spindle lock assembly 60*d* according to another embodiment. The spindle lock assembly 60*d* is similar to the spindle lock assembly 60; therefore, similar components are designated with similar references numbers including the letter "d." At least some differences and/or at least some similarities between the spindle lock assemblies 60, 60*d* will be discussed in detail below. In addition, components or features described with respect to only one or some of the embodiments described herein are equally applicable to any other embodiments described herein.

The illustrated spindle lock assembly 60*d* includes a gearcase ring 85*d* having outwardly extending projections 195*d* (only one is shown in FIG. 12) and inner teeth 110*d*. The gearcase ring 85*d* is received within a gearcase 30*d* such that each outwardly extending projection 195*d* is received within a slot 190*d* (only one is shown in FIG. 12) between adjacent inwardly extending protrusions 205*d* of the gearcase 30*d*. Resilient members 175*d* (e.g., elastomeric plugs/inserts) are positioned between the gearcase ring 85*d* and the gearcase 30*d*. In addition, the gearcase ring 85*d* includes at least one stop 220*d* (e.g., a rib) adjacent each projection 195*d* to be positioned within the respective slot 190*d*. As such, a resilient member 175*d* is constrained between the stop 220*d*, the projection 195*d* of the gearcase ring 85*d*, and the protrusion 205*d* of the gearcase 30*d*. Within a neutral position as shown in FIG. 12, a gap is provided between the stop 220*d* and the protrusion 205*d* of the gearcase 30*d*. As the spindle lock assembly 60*d* transitions into the locked state, the resilient member 175*d* is compressed to absorb rotational forces of the gearcase ring 85*d* until the stop 220*d* engages the protrusion 205*d*. Such engagement inhibits over compression/deformation of the resilient member 175*d*, which could increase wear on the resilient member 175*d*.

In some embodiments, the stop 220*d* can be formed from material that can wear such that the wear of the stop 220*d* generally matches degradation of the resilient member 175*d* to provide more consistent feel when the spindle lock assembly 60*d* transitions into the locked state. In other embodiments, stop 220*d* can be formed on the gearcase 30*d* to engage the projection 195*d* of the gearcase ring 85*d*. In further embodiments, two stops 220*d* can be associated with each projection 195*d* (e.g., a stop 220*d* on each side of the projection 195*d*). In other embodiments, at least one stop 220*d* can be positioned away from the projection 195*d* and received within a separate slot than the projection 195*d*. In yet further embodiments, at least two stops 220*d* can engage the gearcase 30*d*/gearcase ring 85*d* at different torques to provide a first resistance when the spindle lock assembly 60*d* moves in one direction and a second resistance when the spindle lock assembly 60*d* moves in the opposite direction.

Although the dampening spindle lock assembly 60 is described above within the context of a small, hand-held rotary power tool 10 (e.g., drill driver, hammer drill, etc.), the dampening spindle lock assembly 60 may also be used in tools with a significantly larger amount of rotating inertia. Such tools may include, for example, larger drills (e.g., core drills, right angle drills, drill presses, etc.), rotary tools, grinders, saws (e.g., circular saws reciprocating saws, chain saws table saws, etc.), and string trimmers. In such tools, rather than the resilient members 175, 175*a*, 175*b*, 175*c*, 175*d* being used in a spindle lock assembly, the resilient members 175, 175*a*, 175*b*, 175*c*, 175*d* could alternatively be used in conjunction with a mechanical brake that is configured to not fully lock, which would allow for a soft stop to be achieved in a cost-effective manner.

Although the disclosure has been described in detail with reference to certain preferred embodiments, variations and modifications exist within the scope and spirit of one or more independent aspects of the disclosure as described.

Various features of the invention are set forth in the following claims.

We claim:
1. A power tool comprising:
a housing;
a motor supported by the housing;
an output spindle rotatably supported relative to the housing about an axis, the motor operable to drive the output spindle about the axis; and
a spindle lock assembly between the motor and the output spindle, the spindle lock assembly being adjustable between an unlocked state in which the output spindle is rotatable relative to the housing about the axis and a locked state in which the output spindle is rotationally fixed relative to the housing, wherein the spindle lock assembly includes a first resilient member configured to at least partially absorb a torque impulse from the output spindle when rotating in a first direction, when the spindle lock assembly transitions from the unlocked state to the locked state, wherein the spindle lock assembly further includes a cam member coupled to the output spindle, a housing ring coupled to the housing, and a plurality of followers coupled between the cam member and the housing ring, wherein the followers are configured to move radially outward when the spindle lock assembly transitions from the unlocked state to the locked state, wherein the followers are spaced from the housing ring when the spindle lock assembly is in the unlocked state and are engaged with the housing ring when the spindle lock assembly is in the locked state, wherein the cam member includes an inner ring and an outer ring that is rotatable relative to the inner ring about the axis, and wherein the first resilient member is positioned between the inner ring and the outer ring.

2. The power tool of claim 1, wherein the first resilient member is one of a plurality of resilient members positioned between the inner ring and the outer ring.

3. The power tool of claim 1, wherein the inner ring includes a slot defined on an outer peripheral surface thereof, wherein the outer ring includes a radially inward-extending protrusion on an inner peripheral surface thereof, wherein the radially inward-extending protrusion is received in the slot, and wherein the first resilient member is positioned within the slot and adjacent a first side of the radially inward-extending protrusion.

4. The power tool of claim 3, wherein the spindle lock assembly includes a second resilient member positioned within the slot and adjacent an opposite, second side of the radially inward-extending protrusion.

5. A power tool comprising:
a housing;
a motor supported within the housing;
an output spindle rotatably supported relative to the housing about an axis, the motor operable to drive the output spindle about the axis;
a gearcase coupled to the housing;
a gearcase ring positioned within the gearcase; and
a spindle lock assembly between the motor and the output spindle, the spindle lock assembly being adjustable between an unlocked state in which the output spindle is rotatable relative to the gearcase and the housing about the axis and a locked state in which the output spindle is rotationally fixed relative to the gearcase and the housing,
wherein the spindle lock assembly includes a first resilient member configured to at least partially absorb a torque impulse from the output spindle when rotating in a first direction, when the spindle lock assembly transitions from the unlocked state to the locked state,
wherein the spindle lock assembly includes a cam member coupled to the output spindle and a plurality of followers coupled between the cam member and the gearcase ring, wherein the followers are configured to move radially outward when the spindle lock assembly transitions from the unlocked state to the locked state, wherein the plurality of followers is spaced from the gearcase ring when the spindle lock assembly is in the unlocked state and is engaged with the gearcase ring when the spindle lock assembly is in the locked state, wherein the cam member includes an inner ring and an outer ring that is rotatable relative to the inner ring about the axis, and wherein the first resilient member is positioned between the inner ring and the outer ring.

6. The power tool of claim 5, wherein the first resilient member is one of a plurality of resilient members positioned between the inner ring and the outer ring.

7. The power tool of claim 5, wherein the inner ring includes a slot defined on an outer peripheral surface thereof, wherein the outer ring includes a radially inward-extending protrusion on an inner peripheral surface thereof, wherein the radially inward-extending protrusion is received in the slot, and wherein the first resilient member is positioned within the slot and adjacent a first side of the radially inward-extending protrusion.

8. The power tool of claim 7, wherein the spindle lock assembly includes a second resilient member positioned within the slot and adjacent an opposite, second side of the radially inward-extending protrusion.

9. A power tool comprising:
a housing;
a motor supported within the housing;
an output spindle rotatably supported relative to the housing about an axis, the motor operable to drive the output spindle about the axis;
a gearcase coupled to the housing and including first and second radially inward-extending protrusions;
a gearcase ring positioned within the gearcase and including a radially outward-extending projection positioned between the first and second radially inward-extending protrusions; and
a spindle lock assembly between the motor and the output spindle, the spindle lock assembly being adjustable between an unlocked state in which the output spindle is rotatable relative to the gearcase and the housing about the axis and a locked state in which the output spindle is rotationally fixed relative to the gearcase and the housing,
wherein the spindle lock assembly includes
a first resilient member, positioned between the radially outward-extending projection of the gearcase ring and the first radially inward-extending protrusion of the gearcase, and
a second resilient member, positioned between the radially outward-extending projection of the gearcase ring and the second radially inward-extending protrusion of the gearcase, and
wherein each of the first and second resilient members is configured to at least partially absorb a torque impulse from the output spindle when rotating, respectively, in a forward direction and a reverse direction, when the spindle lock assembly transitions from the unlocked state to the locked state, and
wherein the first resilient member is configured to contact the radially outward-extending projection of the gearcase ring when the spindle lock assembly transitions from the unlocked state to the locked state.

10. The power tool of claim 9, wherein the gearcase ring includes a stop adjacent the projection, and wherein the stop is engageable with the second protrusion following compression of the second resilient member to stop relative rotation between the gearcase ring and the gearcase.

11. The power tool of claim 4, wherein the first resilient member has a first hardness, and the second resilient member has a second, different hardness.

12. The power tool of claim 4, wherein the slot is a first slot and the inner ring includes a second slot opposite the first slot, the second slot is defined on an opposite outer peripheral surface of the inner ring, wherein the outer ring includes a second radially inward-extending protrusion on an inner peripheral surface thereof, wherein the second radially inward-extending protrusion is received in the second slot, wherein a third resilient member is positioned within the second slot and adjacent a first side of the second radially inward-extending protrusion, and wherein a fourth resilient member is positioned within the second slot and adjacent an opposite, second side of the second radially inward-extending protrusion.

13. The power tool of claim 8, wherein the first resilient member has a first hardness, and the second resilient member has a second, different hardness.

14. The power tool of claim 8, wherein the slot is a first slot and the inner ring includes a second slot opposite the first slot, the second slot is defined on an opposite outer peripheral surface of the inner ring, wherein the outer ring includes a second radially inward-extending protrusion on an inner peripheral surface thereof, wherein the second radially inward-extending protrusion is received in the second slot, wherein a third resilient member is positioned within the second slot and adjacent a first side of the second radially inward-extending protrusion, and wherein a fourth resilient member is positioned within the second slot and adjacent an opposite, second side of the second radially inward-extending protrusion.

15. The power tool of claim 10, wherein the gearcase ring includes a second stop adjacent the projection, and wherein the second stop is engageable with the first protrusion following compression of the first resilient member to stop relative rotation between the gearcase ring and the gearcase.

16. The power tool of claim 9, wherein the radially outward-extending projection, the first resilient member, and the second resilient member are received within a slot formed between the first and second radially inward-extending protrusion.

17. The power tool of claim 9, wherein the first resilient member is positioned in a pocket between the radially outward-extending projection of the gearcase ring and the first radially inward-extending protrusion of the gearcase.

18. The power tool of claim 9, wherein the radially outward-extending projection is a first radially outward extending projection, and the gearcase ring includes a second radially outward-extending projection positioned between the first and second radially inward-extending protrusions.

19. The power tool of claim 18, wherein the second radially outward-extending projection is positioned between the first radially outward-extending projection and the first radially inward-extending protrusion.

20. The power tool of claim 9, wherein the gearcase includes a third radially inward-extending protrusion positioned between the first and second radially inward-extending protrusions.

* * * * *